(12) United States Patent
MacInnis et al.

(10) Patent No.: US 7,750,974 B2
(45) Date of Patent: *Jul. 6, 2010

(54) SYSTEM AND METHOD FOR STATIC REGION DETECTION IN VIDEO PROCESSING

(75) Inventors: Alexander MacInnis, Lake Oswego, OR (US); Chenhui Feng, Sunnyvale, CA (US)

(73) Assignee: Broadcom Corporation

( * ) Notice: Subject to any disclaimer, the term of this patent is extended or adjusted under 35 U.S.C. 154(b) by 1260 days.

This patent is subject to a terminal disclaimer.

(21) Appl. No.: 11/272,112

(22) Filed: Nov. 10, 2005

(65) Prior Publication Data

US 2007/0103586 A1 May 10, 2007

(51) Int. Cl.
H04N 7/01 (2006.01)
(52) U.S. Cl. ...................... 348/448; 348/441
(58) Field of Classification Search ................. 348/448, 348/441, 452, 451, 458, 459; H04N 7/01, H04N 11/20
See application file for complete search history.

(56) References Cited

U.S. PATENT DOCUMENTS

| | | | | |
|---|---|---|---|---|
| 5,931,934 A | * | 8/1999 | Li et al. ...................... 710/260 |
| 5,960,464 A | * | 9/1999 | Lam ........................... 711/206 |
| 5,978,508 A | * | 11/1999 | Tsuboi ....................... 382/234 |
| 5,978,509 A | * | 11/1999 | Nachtergaele et al. ...... 382/236 |
| 7,057,665 B2 | * | 6/2006 | Jung et al. .................. 348/452 |
| 7,142,247 B2 | * | 11/2006 | Jung .......................... 348/452 |
| 7,170,562 B2 | * | 1/2007 | Yoo et al. ................... 348/452 |
| 7,176,977 B2 | * | 2/2007 | Zhu et al. ................... 348/448 |
| 2004/0263685 A1 | * | 12/2004 | Song .......................... 348/448 |

* cited by examiner

*Primary Examiner*—Sherrie Hsia
(74) *Attorney, Agent, or Firm*—McAndrews, Held & Malloy, Ltd.

(57) ABSTRACT

A system and method for processing video information are disclosed and may include calculating at least one pixel difference between at least one pixel in a first field and at least one corresponding aligned pixel in a second field. The first field and the second field may be adjacent to a current field. At least one pixel in the current field may be deinterlaced based at least in part on the calculated at least one pixel difference. A first pixel difference between a first pixel in the first field and a corresponding aligned second pixel in the second field may be calculated. A second pixel difference between a third pixel in the first field and a corresponding aligned fourth pixel in the second field may be calculated. The third pixel and the fourth pixel may be adjacent to a current output sample.

22 Claims, 5 Drawing Sheets

SYSTEM AND METHOD FOR STATIC REGION DETECTION IN VIDEO PROCESSING

RELATED APPLICATIONS

This application is related to the following applications, each of which is hereby incorporated herein by reference in its entirety for all purposes:

U.S. patent application Ser. No. 11/254,450 filed Oct. 20, 2005;

U.S. patent application Ser. No. 11/254,262 filed Oct. 20, 2005;

U.S. patent application Ser. No. 11/272,116 filed Nov. 10, 2005;

U.S. patent application Ser. No. 11/272,113 filed Nov. 10, 2005;

U.S. patent application Ser. No. 11/272,999 filed Nov. 10, 2005; and

U.S. Provisional Patent Application Ser. No. 60/687,674 filed Jun. 6, 2005.

FIELD OF THE INVENTION

Certain embodiments of the invention relate to processing of video. More specifically, certain embodiments of the invention relate to a system and method for static region detection in video processing.

BACKGROUND OF THE INVENTION

During interlacing, pictures that form a video frame may be captured at two distinct time intervals. These pictures, which may be referred to as fields and which form the video frame, comprise a plurality of ordered lines. During one of the time intervals, video content for even-numbered lines may be captured, while at a subsequent time interval, video content for odd-numbered lines may be captured. The even-numbered lines may be collectively referred to as a top field, while the odd-numbered lines may be collectively referred to as a bottom field. On an interlaced display, the even-numbered lines may be presented for display on the even-numbered lines of a display during one time interval, while the odd-numbered lines may be presented for display on the odd-numbered lines of the display during a subsequent time interval.

With progressive displays, however, all of the lines of the display are displayed at one time interval. During deinterlacing of interlaced video, a deinterlacing process may generate pictures for display during a single time interval. Deinterlacing by combining content from adjacent fields, which is known as weaving, may be suitable for regions of a picture that are characterized by little or no object motion or lighting changes, known as inter-field motion. Displaying both the top field and bottom field at the same time interval may be problematic in cases where the video content comprises significant motion or significant lighting changes. Objects that are in motion are at one position when the top field is captured and another position when the bottom field is captured. If the top field and the bottom field are displayed together, a comb-like, or jagged edge affect may appear with the object. This is referred to as a weave artifact.

Alternatively, deinterlacers may generate a picture for progressive display by interpolating missing lines in a field from adjacent and surrounding lines. This is known as spatial interpolation, or "bobbing". While spatial interpolation avoids weave artifacts in regions with high inter-field motion, spatial interpolation loses vertical detail and may result in a blurry picture.

Conventional methods for deinterlacing interlaced video may produce weave artifacts, for example by incorrectly biasing deinterlacing decisions towards weaving when spatial interpolation may be more appropriate. Similarly, conventional deinterlacing methods may often times bias deinterlacing decisions towards spatial interpolation when weaving may be a more appropriate method for deinterlacing. Furthermore, conventional deinterlacing methods may utilize a determined amount of weaving and spatial interpolation, or "bobbing", which may, however, result in visible artifacts such as contouring artifacts.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for static region detection in video processing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for static region detection in video processing. In one embodiment of the invention, one or more pixel differences may be calculated between at least one pixel in a first field and at least one corresponding aligned pixel in a second field. In this regard, the first field and the second field may be of the same polarity and corresponding pixels within the first and the second fields may be aligned and have the same horizontal and vertical position within the respective video fields. Since the corresponding pixels within the first and second video fields are aligned, phase-shifting of the pixels may not be required for calculating pixel differences between corresponding pixels. The first field and the second field may be adjacent to a current field. The one or more pixel differences may be utilized to calculate a static region indicator value, which may indicate that the video content in the region containing the current output sample location is not moving between the fields adjacent to the current field. For example, the static region indicator value may be calculated based on absolute values of the one or more pixel differences. A lack of motion between adjacent fields within regions including a current output sample location may be detected via the static region indicator value. Furthermore, a spatial/weave blend control value may be determined, based at least in part on the static region indicator value. The spatial/weave blend control value may be utilized to determine whether spatial interpolation, weaving, or a combination thereof may be utilized for deinterlacing the pixel samples from the current field.

Figure 1A:
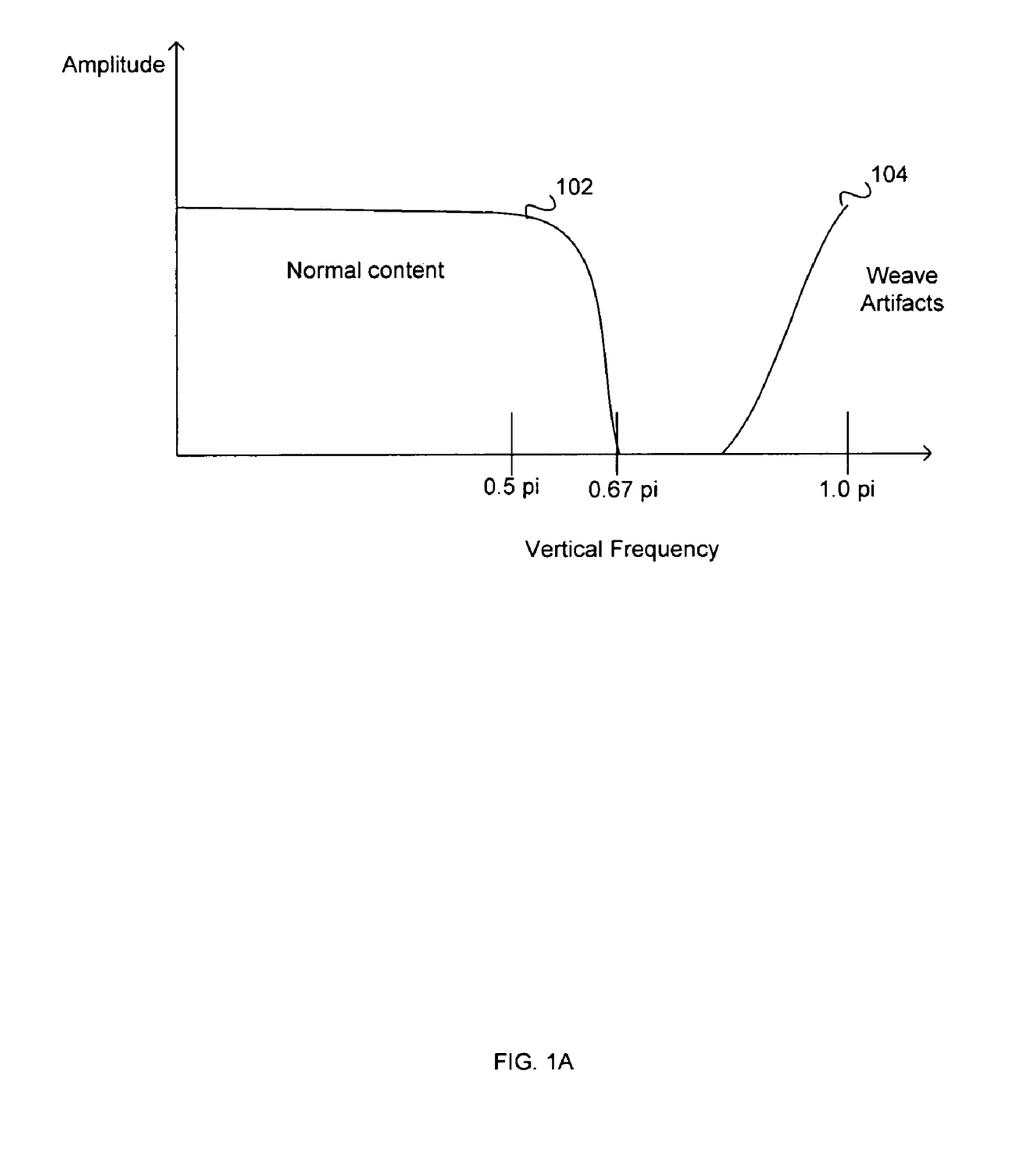
FIG. 1A is a graph illustrating exemplary spectra of video content vertical detail and bad weave artifacts that may be utilized in accordance with an embodiment of the invention.

FIG. 1A is a graph illustrating exemplary spectra of video content vertical detail and bad weave artifacts that may be utilized in accordance with an embodiment of the invention. Referring to FIG. 1A, the exemplary spectra of video content vertical detail may comprise a normal video content vertical detail spectrum 102, and bad weave artifacts spectrum 104. The normal video content vertical detail spectrum 102 lies at a vertical frequency that is less that or equal to approximately 0.67 pi, while the bad weave artifacts spectrum 104 lies at a vertical frequency that is greater than or equal to approximately 0.8 pi.

One goal of deinterlacing is to mitigate or eliminate the bad weave artifacts, which may give rise to the bad weave artifacts spectrum 104. In an exemplary aspect of the invention, a static region indicator value may be calculated for a plurality of pixels from different fields, which may be selected from a plurality of fields before or after the current field. The video fields may then be deinterlaced utilizing weaving and/or spatial interpolation based at least in part on the calculated-static region indicator value so that bad weave artifacts may be avoided.

A lack of motion between adjacent fields within regions including a current output sample location may be detected via the static region indicator value. For example, a low static region indicator value may indicate vertical and/or horizontal motion of content between adjacent fields and spatial interpolation may be conditionally utilized in the region of the current output sample in order to prevent the occurrence of visible weave artifacts, or "bad weaves," when the current field is deinterlaced. For static imagery, which may be indicated by a high static region indicator value, with high vertical frequency detail but no objectionable flicker on an interlaced display, the vertical bandwidth may generally be limited by the Kell factor, which may be considered to be between about 0.6 and 0.7 as illustrated in FIG. 1A. That is, the maximum vertical spectral component that results in perceived detail and not perceived flicker is between about 0.6 and 0.7 of the frame Nyquist limit. The Nyquist limit for any one field of video may be calculated as one half the frame Nyquist limit, since fields have half the vertical sample rate of frames. The frame Nyquist limit may also be referred to as 1.0 pi. In an alternative embodiment, a high static region indicator value may indicate vertical and/or horizontal motion of content between adjacent fields, and a low static region indicator value may indicate static imagery.

In one embodiment of the invention, the static region indicator value calculated for a plurality of pixels in a previous field and a plurality of pixels in a next field may be utilized as an indication of the absence of vertical and/or horizontal motion between a plurality of fields. In this regard, the static region indicator value may be used at least in part to determine an amount of spatial interpolation and an amount of weaving which may be utilized to deinterlace pixels in the current field. The static region indicator may be utilized along with other indicators during, for example, a determination of whether to weave or apply spatial interpolation when reconstructing a current output sample. A method of blending weaving and spatial interpolation is described in U.S. patent application Ser. No. 11/270,999 filed Nov. 10, 2005, which is incorporated herein by reference in its entirety.

Figure 1B:
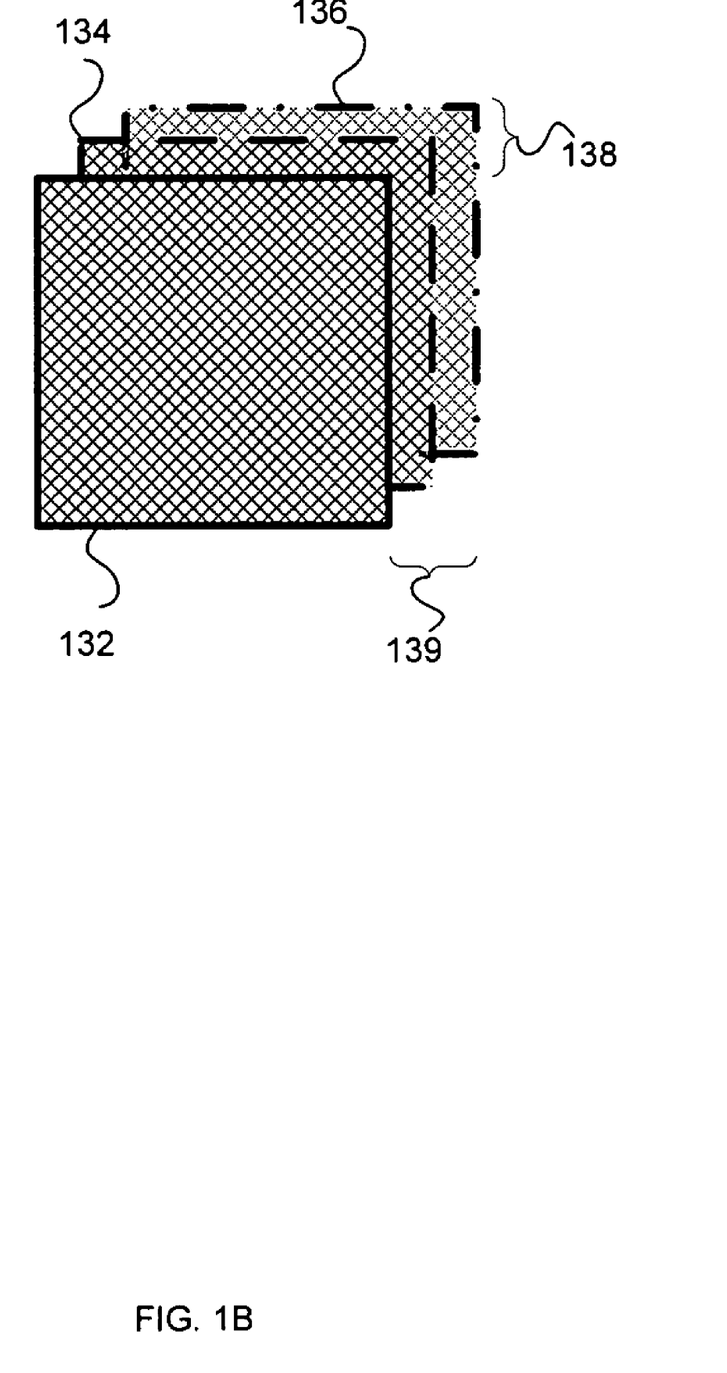
FIG. 1B is a diagram illustrating static regions in adjacent fields, in accordance with an embodiment of the invention.

FIG. 1B is a diagram illustrating static regions in adjacent fields, in accordance with an embodiment of the invention. Referring to FIG. 1B, the rectangular object 132 may be located in the center of a previous field in an interlaced video signal, for example. Corresponding images 134 and 136 of object 132 may be located in the center of a current field and in the center of a next field, respectively, in the interlaced video signal. The previous field and the next field may be of the same polarity so that corresponding pixels within the previous and the next fields may be aligned. In this regard, object 134 in the current video field may correspond to object 132 in the previous field and may be obtained as a result of movement by object 132 from the previous field to the current field. Similarly, object 136 in the next video field may correspond to object 134 in the current field and may be obtained as a result of movement by object 134 from the current field to the next field.

The image of object 134 in the current field may differ from the images of the object 132 in the previous field and object 136 in the next field due to the different field polarity and associated vertical positions of samples of the current field with respect to the previous and next fields. In this regard, pluralities of samples corresponding to objects 132 and 136 may be compared to determine presence of vertical and/or horizontal motion of content between the previous and next fields. If there is vertical and/or horizontal motion of content between the previous and next fields, spatial interpolation may be conditionally utilized in the region of a current output sample in order to prevent the occurrence of visible weave artifacts.

In some instances, there may be little or no movement of object 132 from the previous field to object 134 in the current field, and between object 134 in the current field to object 136 in the next field. In this regard, the distance 138 may be associated with vertical movement from object 132 in the previous field to object 136 in the next field. Similarly, the distance 139 may be associated with horizontal movement from object 132 in the previous field to object 136 in the next field. Furthermore, if distances 138 and 139 are zero, or close to zero, object 132 may be considered static and may be characterized by no, or insignificant amount of movement between a plurality of adjacent fields. If a static region is detected between a plurality of adjacent fields, pure weaving may be utilized for that region when constructing the current output sample in the current field.

In any one field within the interlaced video signal, if there is horizontal and/or vertical movement of content between fields and if the missing lines were filled in using the previous field, i.e. using pure weaving, weave artifacts would tend to appear where the video content is different between previous and current fields. Weave artifacts may resemble comb-like or feather-like edges, or they may have other disturbing appearances.

In one embodiment of the invention, a measure of the presence of a static region between a plurality of adjacent fields, such as the static region indicator value, may be calculated and utilized to determine whether weaving, spatial interpolation, or a mixture thereof, may be used for deinterlacing. The measure of a static region between a plurality of adjacent fields may be based on a difference between a plurality of pixels in the previous field and a plurality of aligned pixels in the next field.

Figure 2:
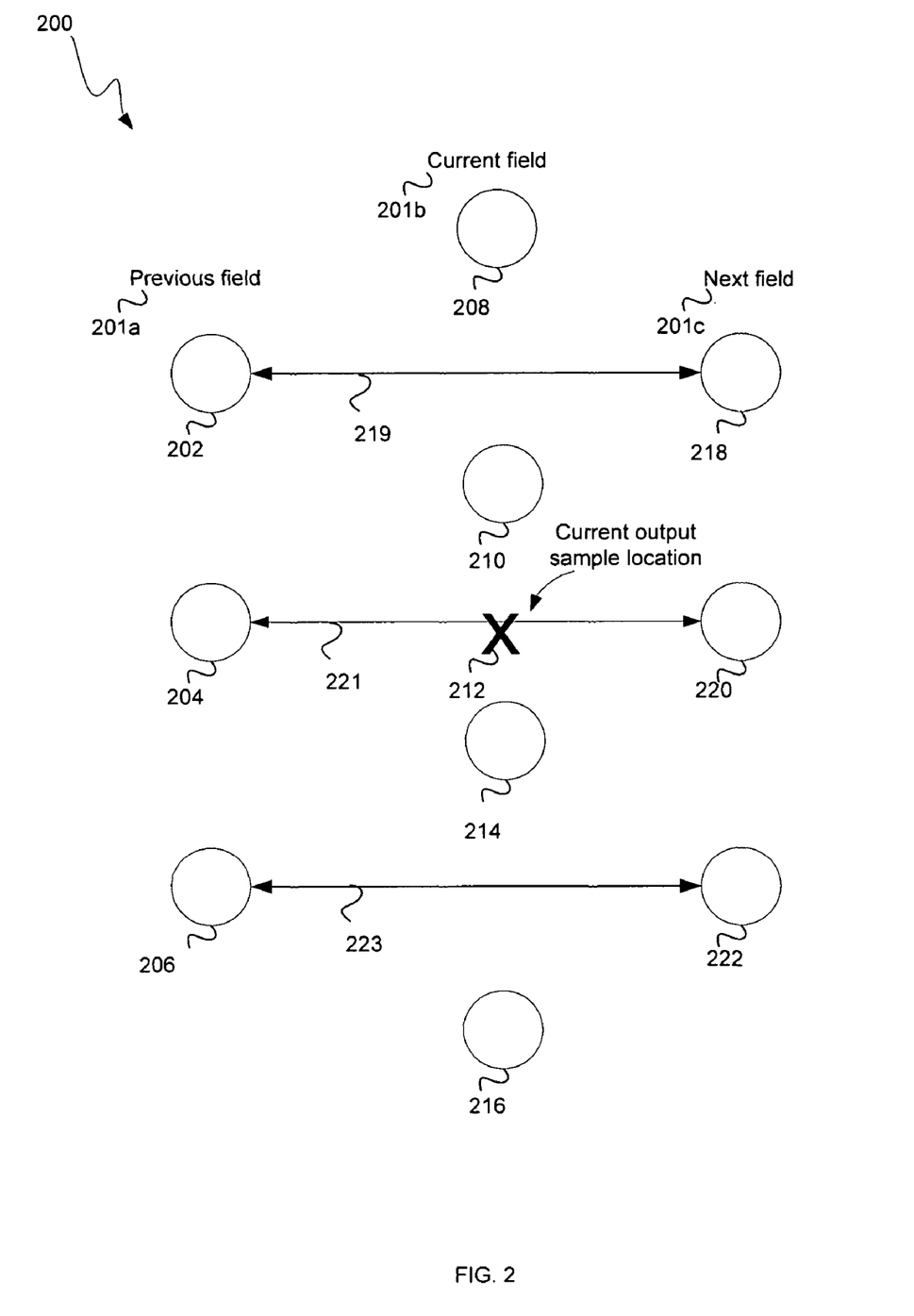
FIG. 2 is a diagram illustrating exemplary selection of pixel samples from previous and next fields for a static region detection calculation, in accordance with an embodiment of the invention.

FIG. 2 is a diagram illustrating exemplary selection of pixel samples from previous and next fields for a static region detection calculation, in accordance with an embodiment of the invention. Referring to FIG. 2, pixel samples 202, . . . , 222 may be selected for calculation of a static region indicator value and may comprise pixels from the previous field 201a and the next field 201c, which are adjacent to the current-field 201b. The previous field 201a and the next field 201c may be of the same polarity and corresponding pixels in the previous field 201a and the next field 201b may be aligned. Fields 201a and 201b may form a video frame comprising vertically adjacent pixels 202, . . . , 216 selected from the adjacent fields 201a and 201b. For example, pixel samples 210 and 214 may be selected from the current field 201b so that pixel samples 210 and 214 may be located immediately above and below, respectively, to a current output sample location 212 within the current field 201b. Pixel samples 208 and 216 may also be selected from the current field 201b so that pixel sample 208 may be located immediately above pixel sample 210, and pixel sample 216 may be located immediately below pixel sample 214.

In addition to pixel samples 208, . . . , 216 selected from the current field 201b, corresponding pixel samples 202, . . . , 206 and 218, . . . , 222 may be selected from the previous field 201a and the next field 201c, respectively, for calculation of the static region indicator value. For example, pixel samples 204 and 220 may be selected from the previous field 201a and the next field 201c so that pixel samples 204 and 220 correspond to the current output sample location 212. Pixel samples 202 and 206 may be selected from the previous field 201a so that pixel samples 202 and 206 may be located immediately above and below, respectively, to the pixel sample 204 within the previous field 201a. Similarly, pixel samples 218 and 222 may be selected from the next field 201c so that pixel samples 218 and 222 may be located immediately above and below, respectively, to the pixel sample 220 within the next field 201c. Corresponding pixels (202, 218), (204, 220) and (206, 222) may be aligned.

Pixels from the current field 201b and the previous field 201a may be weaved together, which may result in weave artifacts if there is horizontal and/or vertical motion of video content between the previous field 201a and the current field 201b. Similarly, pixels from the next field 201c and the current field 201b may be weaved together, which may result in weave artifacts if there is horizontal and/or vertical motion of content between the next field 201c and the current field 201b. The weave artifacts may result from vertical motion, or any other direction, of content with visible details, for example horizontal or near horizontal edges. A plurality of adjacent pixels 202, . . . , 206 from the previous field 201a and a corresponding plurality of adjacent pixels 218, . . . , 222 from the next field 201c may be selected for comparison and calculation of a static region indicator value, for example. A current output sample location 212 may be constructed utilizing weaving or spatial interpolation, based at least in part on the calculated static region indicator value. The value of the static region indicator may change with each current output sample and may also vary within a field.

In an exemplary aspect of the invention, a static region indicator value may be calculated for corresponding pixel pairs 202-218, 204-220, and 206-222 for aligned pixels in the previous field 201a and the next field 201c, respectively. Since pixels 202, . . . , 206 and 218, . . . , 222 are aligned, a static region indicator value may be calculated without phase adjustment filtering of pixels 202, . . . , 206 or pixels 218, . . . , 222.

A static region indicator value may then be determined by initially calculating pixel differences between corresponding pixels in the previous field 201a and the next field 201c. For example, pixel difference 219 may be calculated for pixels 202 and 218 in fields 201a and 201c, respectively. Similarly, pixel difference 221 may be calculated for pixels 204 and 220, and pixel difference 223 may be calculated for pixels 206 and 222 in the previous field 201a and the next field 201c, respectively. The static region indicator value may be calculated based on the determined pixel differences 219, 221, and 223. A static region indicator value may be determined by calculating differences between corresponding pixels of previous field 201a and next field 201c within a region that comprises columns of pixels horizontally adjacent to pixels 202, 204, 206, 218, 220 and 222. For example, one column to the left of the pixels illustrated in FIG. 2 and one column to the right of the pixels illustrated in FIG. 2 may be utilized. Furthermore, two columns to the left of the pixels illustrated in FIG. 2 and two columns to the right of the pixels illustrated in FIG. 2 may be utilized. The pluralities of pixels in previous field 201a and in next field 201c may be non-rectangular sets of pixels.

In one embodiment of the invention, the static region indicator value may be calculated as a weighted sum of the absolute values of the pixel differences 219, 221, and 223. For example, a weight of 1 may be used for the absolute value of pixel differences 219 and 223, and a weight of 2 may be used for the pixel difference 221. Even though weight values of 1 and 2 are utilized, the present invention may not be so limited and other weight values may also be utilized for calculating the static region indicator value. In an alternative embodiment, the static region indicator value may be calculated as a weighted sum of the absolute values of the differences between pixels in a plurality of pixels in previous field 201a and a corresponding plurality of pixels in next field 201c, where each plurality may comprise a rectangular array of pixels. In another alternative embodiment, each plurality may comprise a non-rectangular array of pixels. The weighted sum may then be converted to a value within a range of (−1, 0), for example, via a non-linear function, such as a scaling function and/or a clipping function, or via a look-up table. The calculated static region indicator value may then be utilized to determine the presence of static regions between a plurality of adjacent fields, such as the previous field 201a, the current field 201b, and the next field 201c. Accordingly, the static region indicator value may be utilized to determine whether to construct a current output sample utilizing weaving, if the static region indicator value is −1 or close to −1, or spatial interpolation, if the static region indicator value is 0 or close to 0, or whether to blend between weaving and spatial interpolation if the static region indicator value is between −1 and 0.

In one embodiment of the invention, a static region indicator value may be calculated for each of a luminance (Y), chrominance-red (Cr), and chrominance-blue (Cb) components of pixel samples within a plurality of adjacent fields, such as a previous field and a next field. A total static region indicator value may then be calculated utilizing the static region indicator values calculated for the luminance, chrominance-red, and chrominance-blue components of the pixel samples within the previous and next fields. In another embodiment of the invention, a static region indicator value may be calculated for each of a plurality of pixel components, for example red (R), green (G) and blue (B), or for example Y, Pr and Pb.

Figure 3:
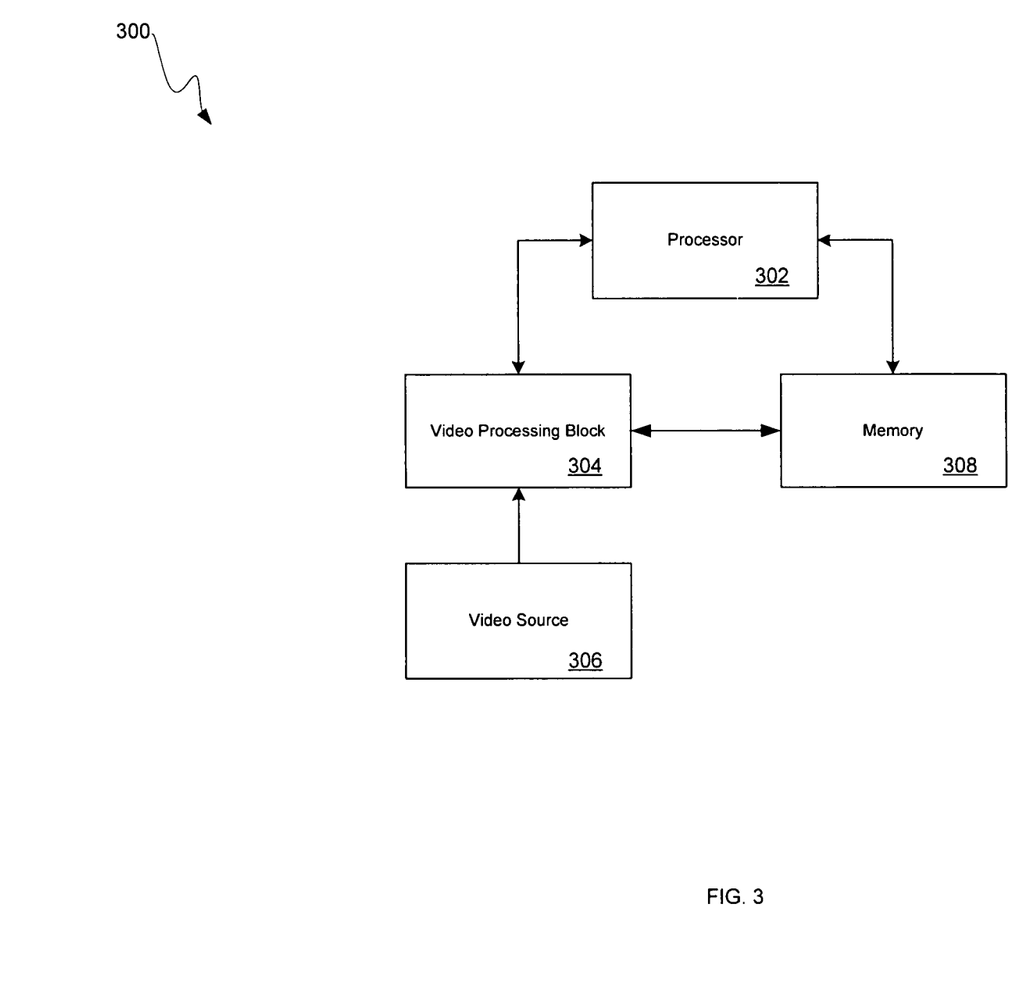
FIG. 3 is a block diagram of an exemplary system for deinterlacing utilizing static region detection, in accordance with an embodiment of the invention.

FIG. 3 is a block diagram of an exemplary system for deinterlacing utilizing static region detection, in accordance with an embodiment of the invention. Referring to FIG. 3, the exemplary system 300 may comprise a processor 302, a video processing block 304, memory 308, and a video source 306. The video source 306 may comprise suitable circuitry, logic, and/or code and may be adapted to communicate raw video stream data, for example, to the video processing block 304. The video processing block 304 may comprise suitable circuitry, logic, and/or code and may be adapted to process the raw video data received from the video source 306. For example, the video processing block 304 may be adapted to deinterlace interlaced video data received from the video source 306. In this regard, the video processing block 304 may be implemented as a specialized video processing chip, or as a specialized video processing function within a chip comprising other functions.

The processor 302 may comprise suitable circuitry, logic, and/or code and may be adapted to control processing of video information by the video processing block 304, for example. The processor 302 may comprise a system or a host processor, or a video processor such as a video processing chip or embedded video processor core. The video processor may be integrated in any device that may be utilized to generate video signals and/or display video. The memory 308 may be adapted to store raw or processed video data, such as video data processed by the video processing block 304. Furthermore, the memory 308 may be utilized to store code that may be executed by the processor 302 in connection with video processing tasks performed by the video processing block 304. For example, the memory 308 may store code that may be utilized by the processor 302 and the video processing block 304 for calculating a static region indicator value and utilizing the calculated static region indicator value during deinterlacing of interlaced video received from the video source 306.

Figure 4:
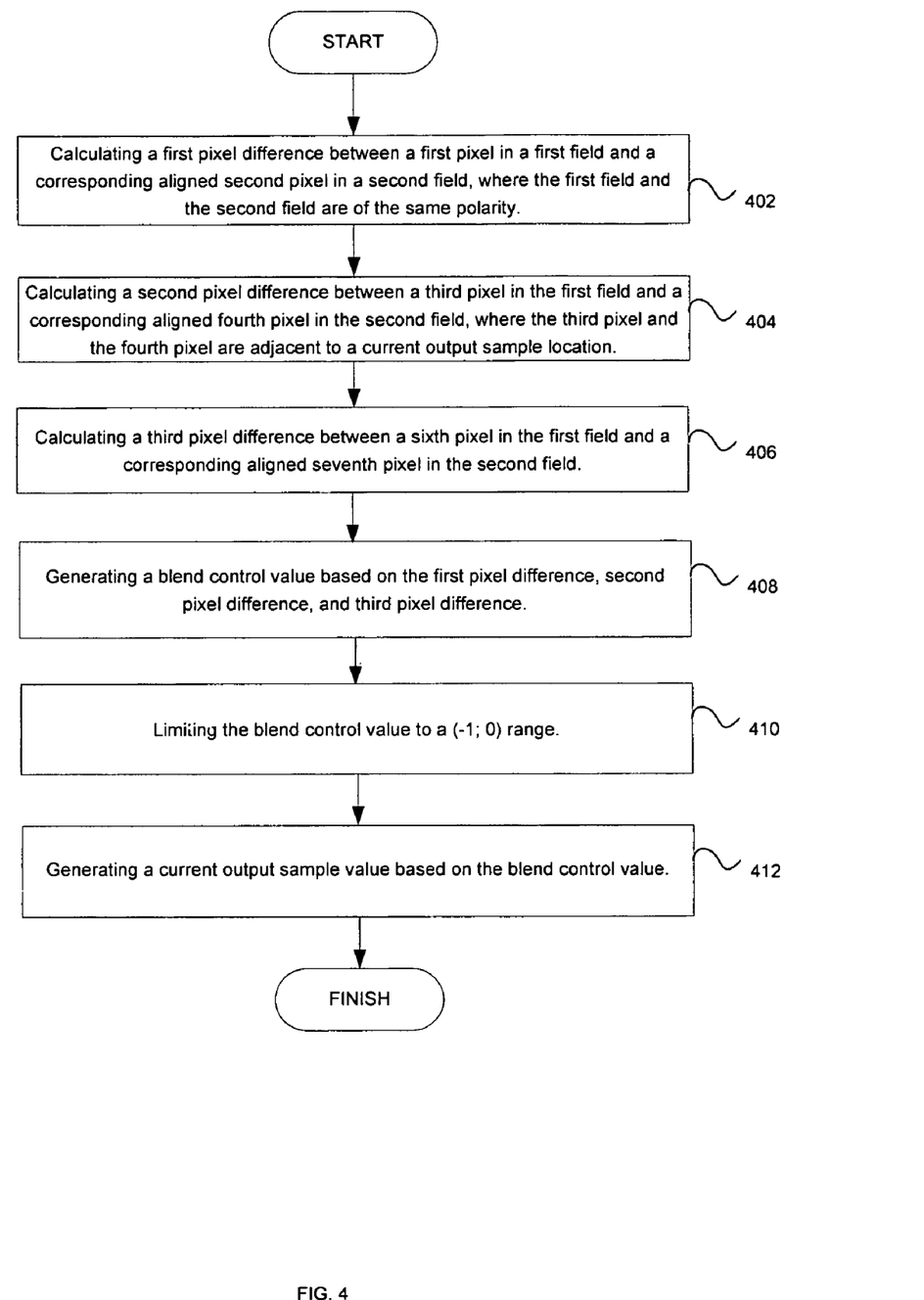
FIG. 4 is a flow diagram illustrating exemplary steps for processing video information, in accordance with an embodiment of the invention.

FIG. 4 is a flow diagram illustrating exemplary steps for processing video information, in accordance with an embodiment of the invention. Referring to FIGS. 2 and 4, at 402, a first pixel difference 219 may be calculated between a first pixel 202 in a first field 201a and a corresponding aligned second pixel 218 in a second field 201c, where the first field 201a and the second field 201c are of the same polarity. At 404, a second pixel difference may be calculated between a third pixel 204 in the first field 201a and a corresponding aligned fourth pixel 220 in the second field 201c, where the third pixel 204 and the fourth pixel 220 are adjacent to a current output sample location 212 in the current field 201b. At 406, a third pixel difference 223 may be calculated between a sixth pixel 206 in the first field 201a and a corresponding aligned seventh pixel 222 in the second field 201c. In another embodiment of the invention, steps 402, 404 and 406 may be repeated for horizontally adjacent sets of pixels and a plurality of pixel differences between aligned pixels may be calculated for the horizontally adjacent sets of pixels. At 408, a blend control value may be generated based on the first pixel difference 219, the second pixel difference 221, and the third pixel difference 223. If horizontally adjacent sets of pixels are utilized for determining pixel differences, the blend control value may be generated based at least in part on the pixel differences for the horizontally adjacent sets of pixels. At 410, the blend control value may be scaled and limited to a (−1, 0) range, for example. A look-up table or a non-linear function, such as a scaling and/or a clipping function may be utilized during the limiting. At 412, the current output sample value may be constructed based on the limited blend control value, for example.

Accordingly, aspects of the invention may be realized in hardware, software, firmware, or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system may typically be determined primarily by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing video information, the method comprising:

performing by one or more processors and/or circuits integrated within a single chip:

calculating at least one pixel difference between at least one pixel in a first field and at least one corresponding aligned pixel in a second field, wherein said first field and said second field are adjacent to a current field; and deinterlacing at least one pixel in said current field based at least in part on a blend control value that is representative of a blend of said calculated at least one pixel difference and at least another pixel difference.

2. The method according to claim 1, comprising calculating a first pixel difference between a first pixel in said first field and a corresponding aligned second pixel in said second field.

3. The method according to claim 2, comprising calculating a second pixel difference between a third pixel in said first field and a corresponding aligned fourth pixel in said second field.

4. The method according to claim 3, wherein said third pixel and said fourth pixel are adjacent to a current output sample.

5. The method according to claim 3, comprising calculating a third pixel difference between a sixth pixel in said first field and a corresponding aligned seventh pixel in said second field.

6. The method according to claim 1, comprising generating said blend control value based at least in part on said calculated at least one pixel difference.

7. The method according to claim 6, comprising limiting said blend control value to a particular range.

8. The method according to claim 7, wherein said limiting of said blend control value is achieved via one or more of a look-up table, a scaling function, and/or a clipping function.

9. The method according to claim 7, comprising deinterlacing said at least one pixel in said current field based on said limited blend control value.

10. A method for processing video information, the method comprising:
performing by one or more processors and/or circuits integrated within a single chip:
calculating at least one pixel difference between a first plurality of pixels in a first pixel region and a second plurality of corresponding aligned pixels in a second pixel region, wherein said first pixel region and said second pixel region comprise a current output sample location; and
determining the value of said current output sample based at least in part on a blend control value that is representative of a blend of said calculated at least one pixel difference and at least another pixel difference.

11. The method according to claim 10, wherein said first plurality of pixels and said second plurality of corresponding aligned pixels comprise one or both of vertically adjacent pixels and/or horizontally adjacent pixels.

12. A system for processing video information, the system comprising:
at least one processor that enables calculation of at least one pixel difference between at least one pixel in a first field and at least one corresponding aligned pixel in a second field, wherein said first field and said second field are adjacent to a current field; and
said at least one processor enables deinterlacing of at least one pixel in said current field based at least in part on a blend control value that is representative of a blend of said calculated at least one pixel difference and at least another pixel difference.

13. The system according to claim 12, wherein said at least one processor enables calculation of a first pixel difference between a first pixel in said first field and a corresponding aligned second pixel in said second field.

14. The system according to claim 13, wherein said at least one processor enables calculation of a second pixel difference between a third pixel in said first field and a corresponding aligned fourth pixel in said second field.

15. The system according to claim 14, wherein said third pixel and said fourth pixel are adjacent to a current output sample.

16. The system according to claim 14, wherein said at least one processor enables calculation of a third pixel difference between a sixth pixel in said first field and a corresponding aligned seventh pixel in said second field.

17. The system according to claim 12, wherein said at least one processor enables generation of said blend control value based at least in part on said calculated at least one pixel difference.

18. The system according to claim 17, wherein said at least one processor enables limiting of said blend control value to a particular range.

19. The system according to claim 18, wherein said limiting of said blend control value is achieved via one or more of a look-up table, a scaling function, and/or a clipping function.

20. The system according to claim 18, wherein said at least one processor enables deinterlacing of said at least one pixel in said current field based on said limited blend control value.

21. A system for processing video information, the system comprising:
at least one processor that enables calculation of at least one pixel difference between a first plurality of pixels in a first pixel region and a second plurality of corresponding aligned pixels in a second pixel region, wherein said first pixel region and said second pixel region comprise a current output sample location; and
said at least one processor enables determination of the value of said current output sample based at least in part on a blend control value that is representative of a blend of said calculated at least one pixel difference and at least another pixel difference.

22. The system according to claim 21, wherein said first plurality of pixels and said second plurality of corresponding aligned pixels comprise one or both of vertically adjacent pixels and/or horizontally adjacent pixels.

* * * * *